United States Patent
Jawahir et al.

[11] Patent Number: 5,941,143
[45] Date of Patent: Aug. 24, 1999

[54] METHOD OF ASSESSING CHIP BREAKABILITY PERFORMANCE

[75] Inventors: Ibrahim S. Jawahir; Ranajit Ghosh, both of Lexington, Ky.; Marshall M. Lin, Reynoldsburg, Ohio

[73] Assignee: University of Kentucky Research Foundation, Lexington, Ky.

[21] Appl. No.: 08/728,570

[22] Filed: Oct. 10, 1996

Related U.S. Application Data

[60] Provisional application No. 60/007,342, Nov. 16, 1995.

[51] Int. Cl.$^6$ .................................................. B23B 1/00
[52] U.S. Cl. ................................................ 82/1.11; 82/47
[58] Field of Search ........................... 82/1.11, 47; 407/2, 407/3, 4, 5, 6, 115, 116

[56] References Cited

U.S. PATENT DOCUMENTS

| | | |
|---|---|---|
| 4,549,270 | 10/1985 | Fukumura et al. . |
| 4,887,221 | 12/1989 | Davis et al. . |
| 4,896,273 | 1/1990 | Moore et al. . |
| 5,075,866 | 12/1991 | Goto et al. . |
| 5,249,135 | 9/1993 | Fujita . |
| 5,267,141 | 11/1993 | Morita et al. . |
| 5,285,378 | 2/1994 | Matsumoto . |
| 5,289,367 | 2/1994 | Sasaki et al. . |
| 5,357,439 | 10/1994 | Matsuzaki et al. . |
| 5,377,116 | 12/1994 | Wayne et al. ............ 364/474.17 |
| 5,378,218 | 1/1995 | Daimaru et al. . |
| 5,473,532 | 12/1995 | Unno et al. . |
| 5,517,537 | 5/1996 | Greene et al. ............. 376/252 |
| 5,689,062 | 11/1997 | Jawahir et al. ............ 82/1.11 X |

OTHER PUBLICATIONS

Jawahir, I.S. et al.; Recent Developments in Chip Control Research and Applications; Annals of the Cirp; vol. 42, No. 2; 1993 659–693.

Jawahir, I.S. et al.; The tool Resticted Contact Effect as a Major Influencing Factor in Chip Breaking: An Experimental Analysis; Annals of the Cirp; vol. 37,3; p. 121–6.

Fei et al., "A Fuzzy Classification Technique for Predictive Assesment of Chip Breakability for Use in Intelligent Machining Systems", IEEE 2nd International Conference on Fuzzy Systems, p. 1275, Apr. 1993.

*Primary Examiner*—Andrea L. Pitts
*Assistant Examiner*—Henry W. H. Tsai
*Attorney, Agent, or Firm*—King & Schickli

[57] ABSTRACT

A method is provided for assessing chip breaking performance of a selected tool insert used in finish turning for automated machining operations. The method broadly includes the steps for developing a chip groove classification system based upon selected geometric parameters of commercially available tool inserts. Additionally, the method includes creating a fuzzy rule base utilizing the chip groove classification system and actual chip breaking performance data for the commercially available tool inserts. The fuzzy rule base is then used for assessing the chip breaking performance of the selected tool insert. The method takes into account selected geometric parameters, such as, land, primary rake, secondary rake, groove width, groove depth, groove height and slope of backwall.

9 Claims, 6 Drawing Sheets

TOOL INSERT PROFILE

A: Edge Radius      B: Primary Rake        C: Land                    D: First Groove Width
E: First Groove Depth   F: First Backwall Slope   G: First Backwall Height   I: Secondary Rake Angle
J: Second Groove Width  L: Second Backwall Slope  M: Second Backwall Height

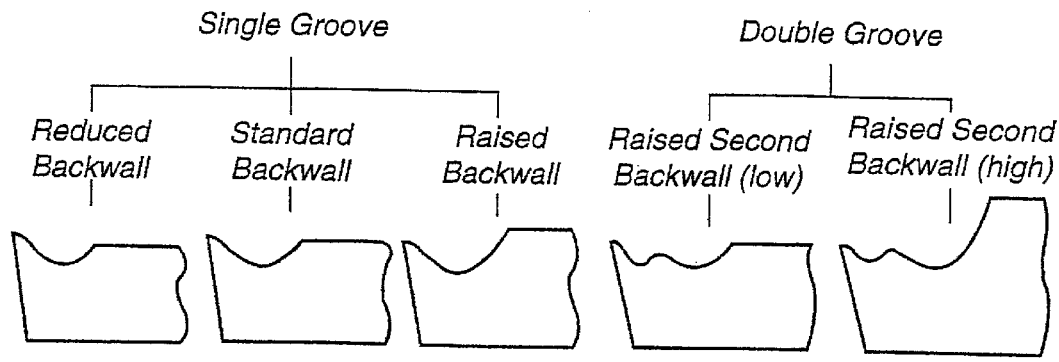
Fig. 4
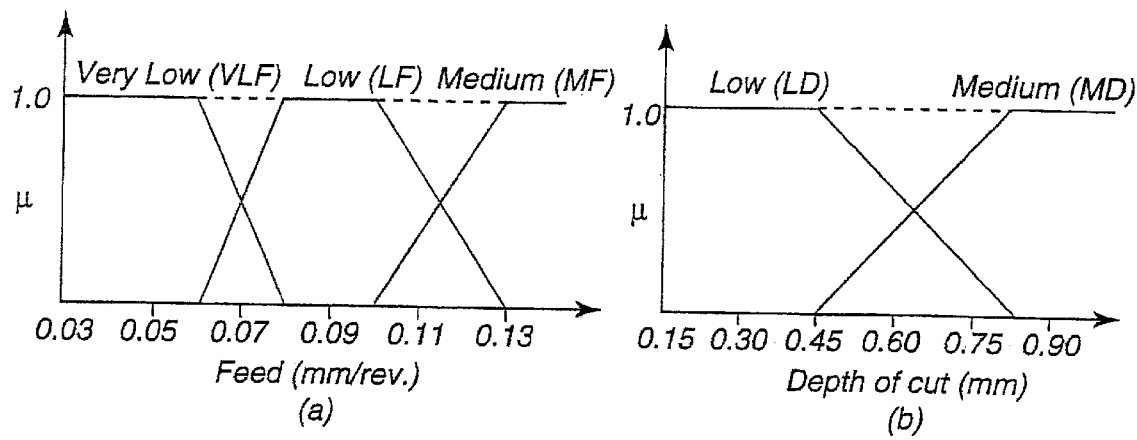
Fig. 5a
Fig. 5b

| CHIP CHART | | MATERIAL: 1045 STEEL U: 230 m/min. $C_s$: 75 deg. INSERT: TNMG 332-CG1 | | | | | | | |
|---|---|---|---|---|---|---|---|---|---|
| D E P T H  O F  C U T (mm) | 2.54 | | | | | | | | |
| | 1.91 | | | | | | | | |
| | 1.02 | | | | | | | | |
| | 0.64 | | | | | | | | |
| | 0.25 | | | | | | | | |
| | | 0.056 | 0.074 | 0.107 | 0.130 | 0.191 | 0.254 | 0.312 | 0.450 |
| | | Feed (mm/rev.) | | | | | | | |

Fig. 7

METHOD OF ASSESSING CHIP BREAKABILITY PERFORMANCE

Benefit of priority is hereby claimed on U.S. Provisional Patent Application Serial No. 60/007,342, filed Nov. 16, 1995, entitled "Chip Breakability Assessment System".

TECHNICAL FIELD

The present invention relates generally to the field of tool inserts used in automated machining operations and, more particularly, to a method for assessing chip breaking performance of a selected tool insert.

BACKGROUND OF THE INVENTION

The present industrial requirements for automated machining has generated new, efficient and more effective means to evaluate chip breaking performance. The assessment or predictability of chip form or chip breaking performance is, however, a very difficult task due to inadequate understanding of various interrelated factors, such as, work and tool material properties, chip groove geometry and cutting conditions. In addition, with the continuous advancement of cutting tool technology, a wide variety of new, innovated tool materials and coating techniques have been developed which further complicate the process of predictive assessment. Therefore, no predictive theory has so far been developed to accurately and reliably estimate chip form or chip breaking performance.

Numerous studies and research projects have been undertaken during the last thirty years with hopes of better understanding the nature of chip flow and chip-curl over groove and obstruction type chip-breakers. For example, these studies range from an early work investigating chip curl with obstruction type chip breakers (see Nakayama, K., "Chip Curl in Metal Cutting Process", *Bul. of Faculty Engg.* Yokohama National University, 1962, Volume 11, p. 1) to later work performed on the actual mechanisms of chip flow, chip curl and chip breaking through high speed filming experiments (see, Jawahir, I. S., "On the Controllability of Chip Breaking Cycles and Modes of Chip Breaking in Metal Machining", *Annals of the CIRP,* 1990, Volume 39, No. 1, p. 47). Still, despite .continuing efforts in modeling and developing theoretical foundations for chip breaking, very little progress has been made thus far.

The best chip form or chip breakability guides available today are chip charts, available from tool insert vendors, which are based upon feed-depth of cut mapping of producible chips. However, these charts do not fully serve the purpose for which they are developed because variable factors, such as, nose radius, side cutting angle, and cutting speed, all of which drastically alter the chip form or chip breakability patterns, are generally not taken into consideration when producing the chip charts. Routinely, these chip charts are developed from limited experiments on one work material with one nose radius and one side cutting angle at a given cutting speed.

In addition, many tool manufacturers recommend two completely different chip grooves for the same application range. To further compound the problem, no comparative assessment is available among tool inserts which are produced among different manufacturers and are recommended for the same application, although, in practice the tool inserts have been found to behave quite differently. Thus, the present situation is not only due to a lack of fundamental knowledge of chip breaking, but also due to the absence of standards for chip groove classification to identify the most profound geometric parameters of tool inserts and to provide a basis for comparison of chip breaking performance. A need is therefore identified for an improved method for assessing chip breaking performance of a selected tool insert.

SUMMARY OF THE INVENTION

Accordingly, it is a primary object of the present invention to provide a new and improved method, for both assessing chip breaking performance of a selected tool insert used in automated machining operations and for performing comparative assessments of other tool inserts, overcoming the above described limitations and shortcomings of the prior art.

Another object of the present invention is to provide a method for assessing chip breaking performance of a selected tool insert by developing a chip groove classification system wherein commercially available tool inserts are characterized and evaluated based upon various tool geometry parameters and actual chip breaking performance.

Yet another object of the present invention is to provide a method for assessing chip breaking performance of a selected tool insert which directly correlates chip groove geometric parameters with chip breaking performance so as to eliminate expensive and time consuming experimentation by users of tool inserts as a means to determine the effectiveness of the selected tool inserts.

Additional objects, advantages and other novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the foregoing and other objects, and in accordance with the purposes of the present invention as described herein, an improved method for assessing chip breaking performance of a selected tool insert is provided. Generally, the method includes the step of developing a chip groove classification system based upon geometric characteristics and actual chip breaking performance of commercially available tool inserts. Advantageously, the chip groove classification system takes into consideration several geometric parameters anyone of which may individually or collectively play an important role in defining the chip breaking performance. The geometric parameters are selected from a group consisting of edge radius, primary rake, land, first groove width, first groove depth, first backwall slope, first backwall height, secondary rake angle, second groove width, second backwall slope and second backwall height.

The method may also be broadly described as including the step of establishing a fuzzy rule base from which the chip breaking performance of any selected tool insert utilized in finished turning operations may be determined. Particularly, the fuzzy rule base is developed by using fuzzy inferencing techniques combined with the experimentally obtained chip breakability data for the commercially available tool inserts. Advantageously, this allows for the evaluation of chip breaking performance for any given tool insert under a range of cutting conditions based upon the tool insert's groove profile as established by the various geometric parameters.

More specifically describing the method, it includes the step of classifying the commercially available tool inserts into groups according to their geometric profiles. These groups of classifications include (a) single groove with reduced backwall, (b) single groove with standard backwall, (c) single groove with raised backwall, (d) double groove with low raised second backwall and (e) double groove with high raised second backwall.

The method further includes the step of characterizing the commercially available tool inserts as a specific groove type GT which is a function of groove width GW and groove depth GD. Next, the groove type GT is combined with the backwall characterization to obtain a combined profile type CPT. The CPT results in a characterization which combines the groove type and backwall height and functionally determines the geometric features of a chip groove so as to effectively allow for the development of a method for assessing chip breaking performance. The method also includes the step of developing an order of importance for all the geometric parameters based upon the amount of influence each geometric parameter has upon chip breaking performance. The method then takes the order of influence into consideration when developing the fuzzy rule base.

Finally, the method includes the step of determining the chip breaking performance for a selected tool insert utilized in finished turning operations given the geometric profile of the selected tool insert. Advantageously, this allows for a user of tool inserts to effectively select a proper tool insert for a given operation to as well as, make a comparative analysis of a variety of tool inserts in order to select the most appropriate for a given situation.

Still other objects of the present invention will become apparent to those skilled in this art from the following description wherein there is shown and described a preferred embodiment of this invention, simply by way of illustration of one of the modes best suited to carry out the invention. As it will be realized, the invention is capable of other different embodiments and its several details are capable of modification in various, obvious aspects all without departing from the invention. Accordingly, the drawings and descriptions will be regarded as illustrative in nature and not as restrictive.

BRIEF DESCRIPTION OF THE DRAWINGS

The accompanying drawing incorporated in and forming a part of the specification, illustrates several aspects of the present invention and together with the description serves to explain the principles of the invention. In the drawing:

FIG. 4 shows the two basic types of grooves, including their respective subdivisions;

FIG. 5a shows the three linguistic regions for classification according to feed rate;

FIG. 5b shows the two regions for classification according to depth of cut;

FIG. 7 shows an experimental chip chart for tool insert CG 13, the chip breaking performance of which is set forth and analyzed in Example 2.

Reference will now be made in detail to the present preferred embodiment of the invention, an example of which is illustrated in the accompanying drawing.

DETAILED DESCRIPTION OF THE INVENTION

It has long been recognized that c hip groove geometry of a selected tool insert utilized in finish turning operations plays an important role in assessing the chip breaking performance of the tool insert. However, no attempt has thus far been made in correlating the chip groove geometric parameters with the chip breaking performance despite continued efforts in developing and modeling theoretical foundations for chip breaking. The need for classifying chip grooves according to their geometric features is increasingly important due to the extremely complex tool geometries in combination with the wide range of design features that are presently available. In addition, the assessment of chip breaking performance is usually quite difficult due to the inherent difficulties in defining acceptable or unacceptable chips. Quantification of chip breaking is an important aspect for developing a predictive system. Therefore, it appears that the most logical approach towards developing any predictive system for chip breakability, or for the assessment of chip forms, is to develop a viable framework for establishing effects of varying chip groove parameters on chip breaking performance. The development of such a predictive system is also set forth in the following publications: (1) Jawahir, I. S. et al.; "Chip Breakability Assessment Using A Chip-Groove Classification System in Finish Turning"; Proceedings ASME Conference; November 1995; (2) Fei, J. et al.; "A. fuzzy Classification Technique for Predictive Assessment of Chip Breakability for Use in Intelligent Machining Systems"; IEEE 2nd International Conference on Fuzzy Systems; 1993. p. 1275; (3) Jawahir, I. S. et al.; "Recent Developments in Chip Control Research and. Applications"; Annals of the CIRP; 1993; Volume 42 No. 2; p. 659 all of which is incorporated therein by reference.

Accordingly, the method of the present invention starts with the development of a chip groove classification system for the assessment of chip breaking performance. In developing such a classification system, cutting tool inserts which are commercially available from various cutting tool manufacturers are considered for classification. More particularly, since the effectiveness of chip breaking is essentially a result of the groove geometry, it is first necessary to obtain a cross-sectional profile of the chip groove for each commercially available tool insert to be used as a foundation from which to analyze the chip breaking performance for a selected tool insert with a given chip groove profile.

Figure 1:
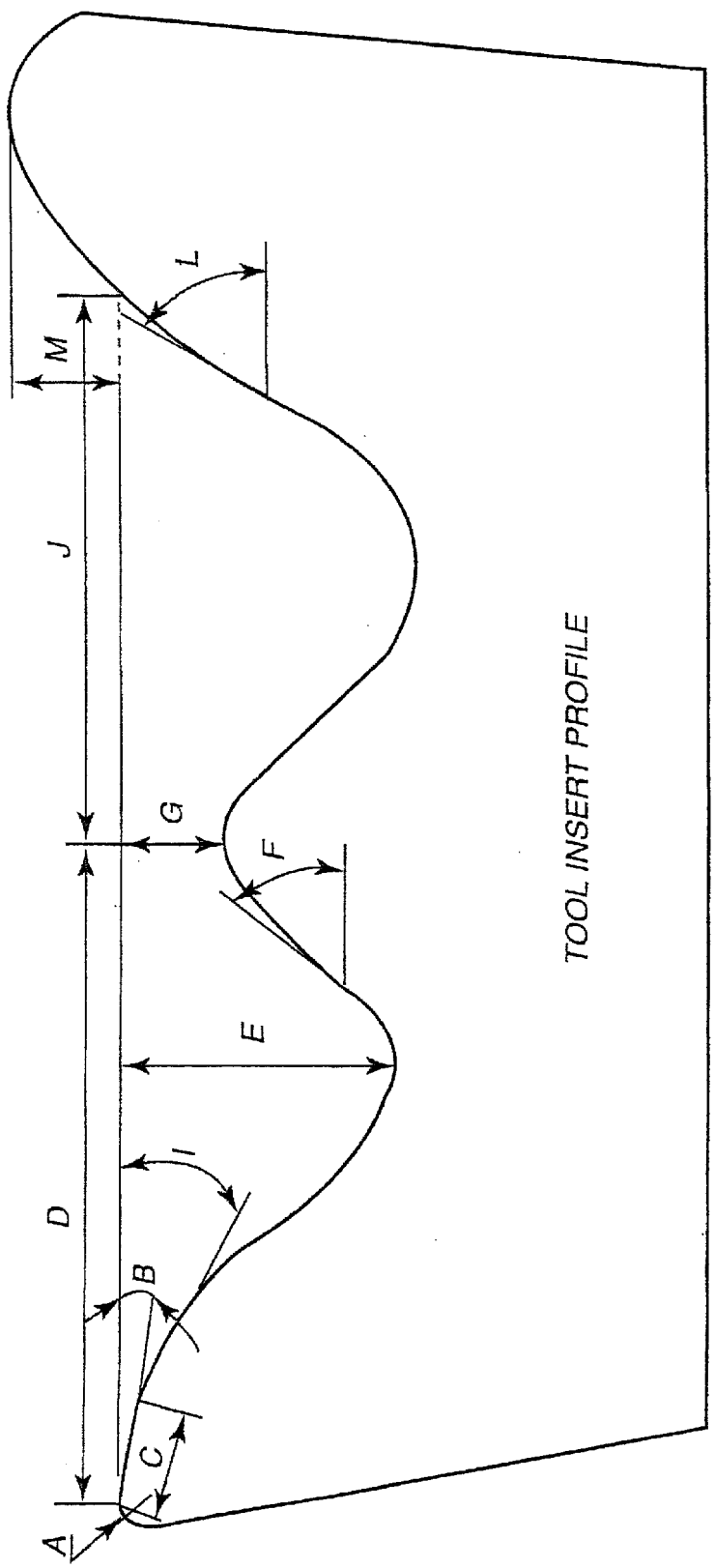
FIG. 1 is a cross-sectional view showing a typical tool insert profile with various geometric parameters designated by reference letters.

Reference is now made to FIG. 1 showing a typical tool insert profile with corresponding reference letters showing the most significant chip groove geometric parameters. More specifically, the chip groove geometric parameters include the following:

A=edge radius

B=primary rake

C=land

D=first groove width

E=first groove depth

F=first backwall slope

G=first backwall height
I=secondary rake angle
J=second groove width
L=second backwall slope
M=second backwall height A chip groove profile may be established, for example, by tracing along the median of the nose radius so as to represent a finish turning application involving a low depth of cut, wherein a large chip side flow angle is present. In addition, the actual chip groove profiles may be traced and recorded using any means which is known in the art, such as, for example, a profilometer.

Figure 2A:
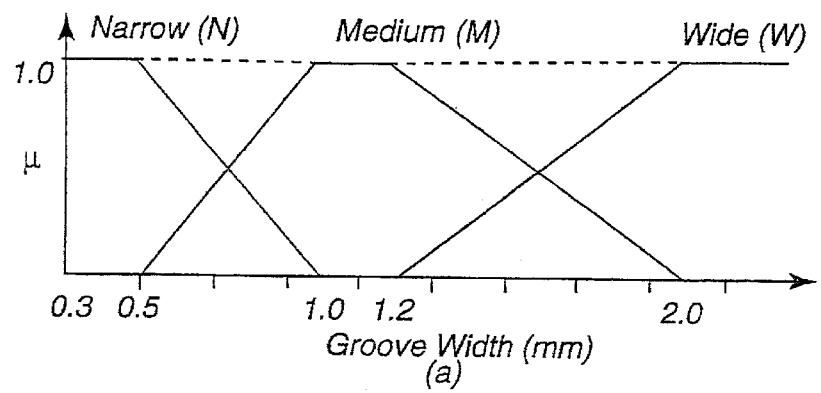
FIG. 2a shows a graph for classification according to groove width GW into three linguistic subgroups.
Figure 2B:
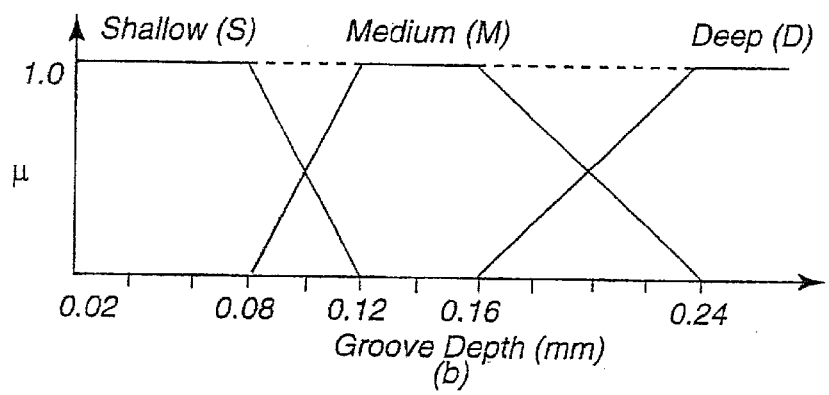
FIG. 2b shows a graph for classification according to groove depth GD into three linguistic subgroups.

Once the surface profile is established and the geometric parameters are measured for each commercially available tool insert to be used in the classification system, a characterization of the individual chip grooves is then performed. More particularly, this characterization is done based upon the groove width GW and groove depth GD. With reference to FIG. 2a, it can easily be seen that the groove width is classified into three linguistic subgroups, wherein:
N=narrow
M=medium
W=wide In a similar fashion, as shown in FIG. 2b, the groove depth GD is also classified into three linguistic subgroups, wherein:
S=shallow
M=medium
D=deep Once the groove width GW and groove depth GD characterizations are complete, these characterizations are combined to generate a groove type GT for each commercially available tool insert. Since there are three linguistic subgroups for both groove width GW and groove depth GD, this results in nine possible combinations of groove types GT being generated. A complete set of these nine possible groove types GT are shown in the 3-D state space diagram of FIG. 3, with the resulting groove types GT designated as GT1–GT9. More specifically, a groove type GT1 is a combination of GW1 and GD1 signifying a groove type with a physical representation as a small, shallow groove. Similarly, a combination of GW3 and GD3 results in a groove type GT9, physically representing a very deep, wide groove. Thus, it should be appreciated that depending on the specific values of width and depth of a chip groove, an insert could belong to at most two of the subgroups, with different membership levels $\mu$. In addition, it should be appreciated that this also gives rise to a maximum of four different groove types for a particular insert.

The method of the present invention provides for a fuzzy classification of groove type assessment done by employing a combination of maximum and minimum operation as follows:

$$\mu_{GT}(GT_n) = \max_{i, j} \min(\mu_{GD_i}(GW), \mu_{GD_j}(GD), \mu_{ij}(GT_n)) \quad \text{Equation 1}$$

where $\mu_{GT}$ denotes the membership value for a groove type based on groove width and groove depth parameters; $\mu_{GW}$ denotes the membership value for a groove type based on groove width; and $\mu_{GD}$ denotes the membership value for a groove type based on groove depth.

The following example is presented to further illustrate how a groove type GT characterization is obtained according to the method of the present invention, and is not to be considered as limited thereto.

EXAMPLE 1

Figure 3:
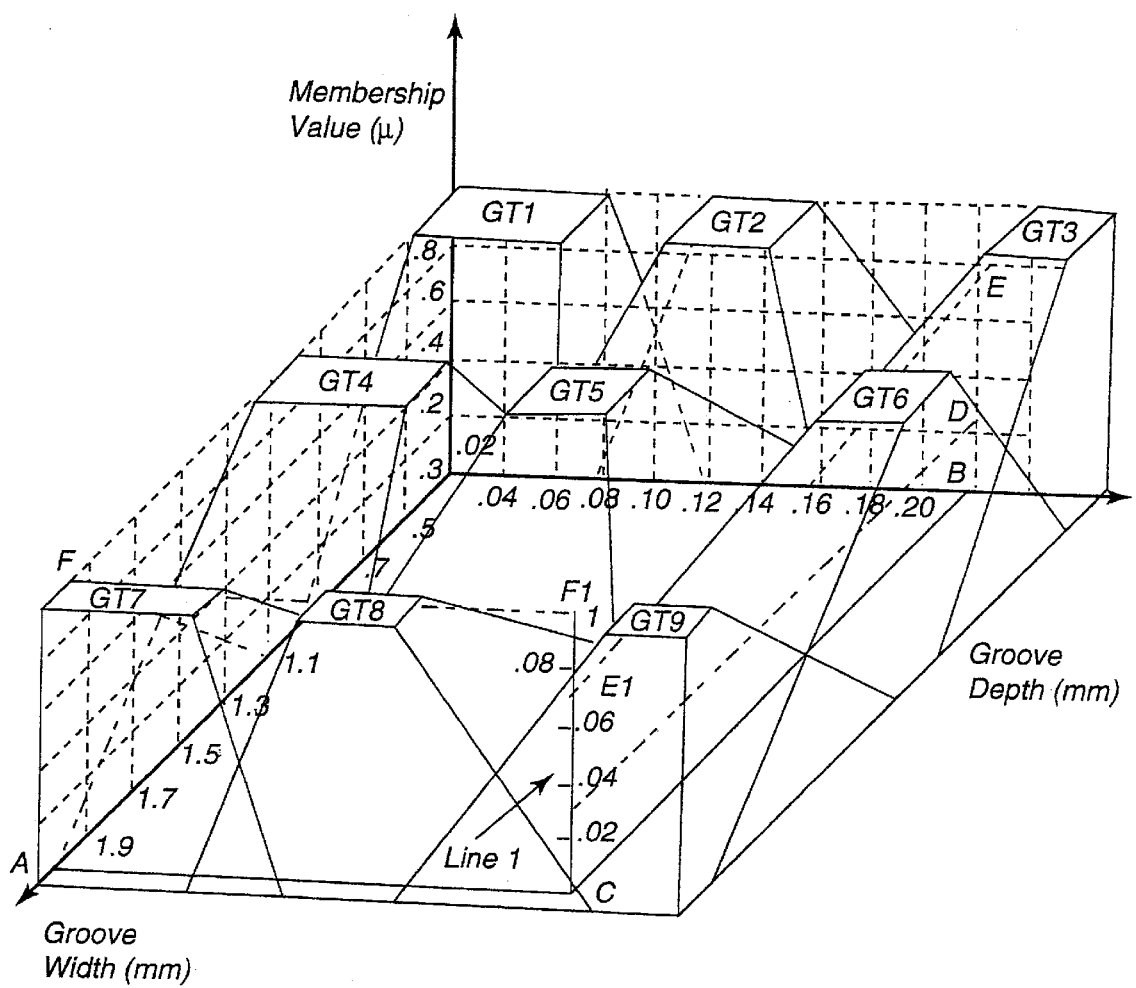
FIG. 3 is a 3-D state space diagram showing the nine possible groove types GT obtained as a combination of the groove width GW and groove depth GD characterizations.

For purposes of this example, a chip groove is provided with a groove width GW=2.1 mm and a groove depth G=0.22 mm. With reference to FIG. 2a, it is determined that a chip groove having a groove width GW=2.1 mm is classified into the subgroup of "wide" with a certainty value of $\mu_{GW}$=1.0. Similarly, with reference to FIG. 2b it is determined that a chip groove having a groove depth GD=0.22 mm belongs to two fuzzy classification subgroups with certainty levels of 0.25 for "medium" subgroup and 0.75 for "deep" subgroup. Accordingly, since groove width GW belongs to only one fuzzy subgroup "wide" a total of two groove types may be assigned. This is done by combining pairs of points D1, F1 and E1, F1, as shown in FIG. 3, with the certainty level found while taking the minimum of the membership levels of D1, F1 and E1, F1 respectively. The resulting groove classification for this chip groove is then found as {0.75/GT9, 0.25/GT8}.

Figure 2C:
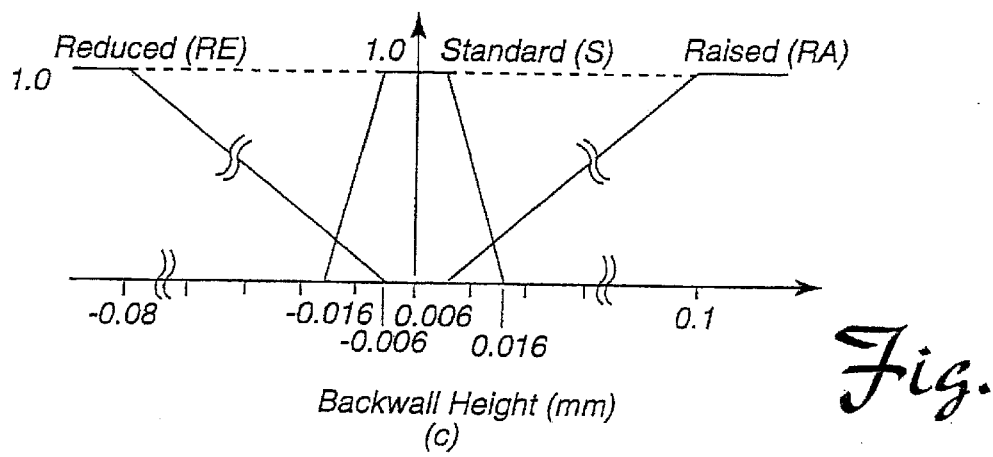
FIG. 2c shows a graph for classification according to backwall height into three linguistic subgroups.

A further step in developing the overall chip groove classification system includes establishing a characterization of the backwall height BH, as shown in FIG. 2c. More specifically, the backwall height BH is classified into three linguistic subgroups, wherein:
RE=reduced
SD=standard
RA=raised It should be appreciated that this is done in a manner similar to the classification of groove width GW and groove depth GD, as set forth and described above.

Once the individual characterizations of both the chip groove profiles and the backwall features are completed, it is then possible to develop an overall grouping of the tool inserts based upon their similarities and geometric characteristics. More specifically, as shown in FIG. 4, inserts used in the finish turning range are grouped into two basic types of grooves: single groove and double groove. These are again subdivided based upon the nature of the backwall as further shown in FIG. 4. Thus, it should be appreciated that any commercially available finish turning tool insert is generally expected to belong to one of these categories. The essential reason for grouping the tool inserts into different categories is to identify the roles of the various geometric parameters in chip breaking, and to correlate the estimated effects with the experimental chip charts, as will be explained in further detail below.

Figure 6:
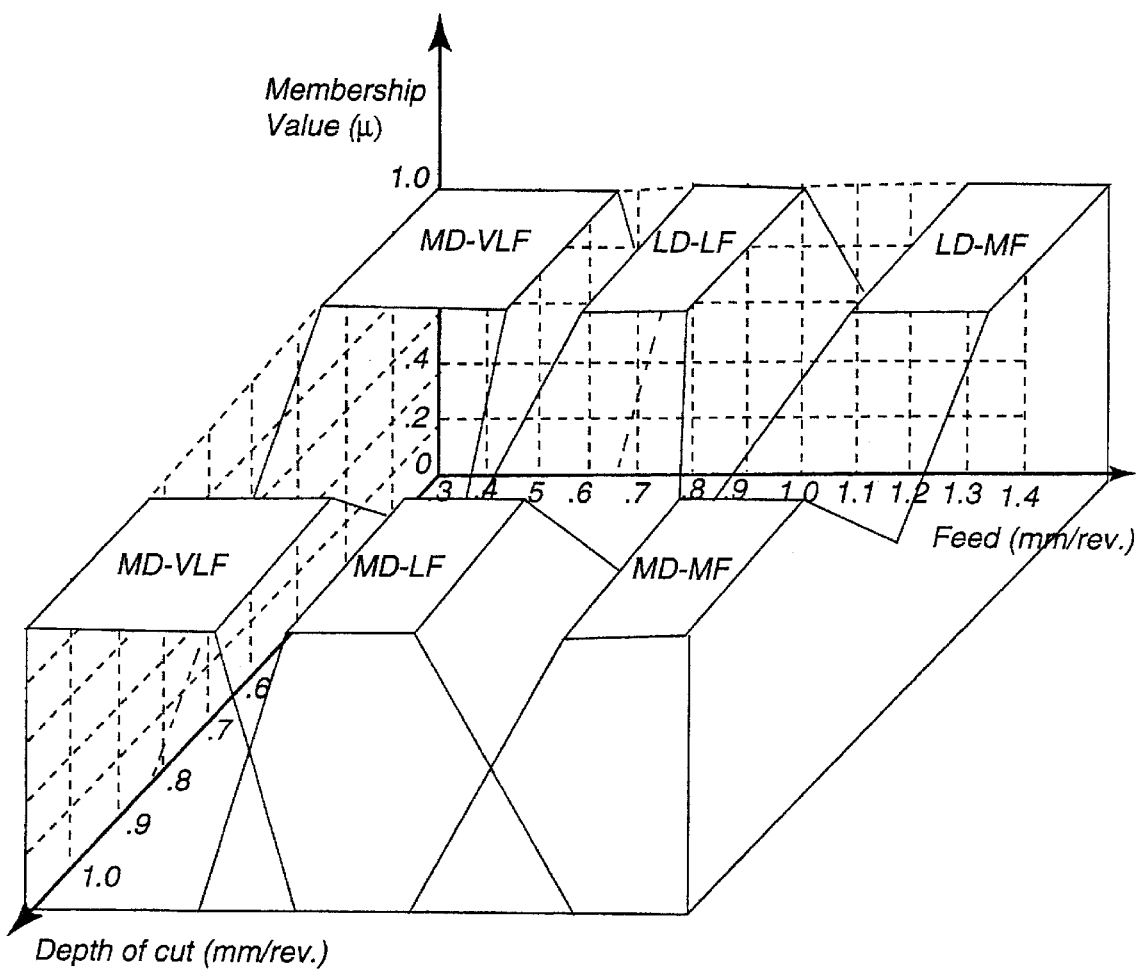
FIG. 6 is a 3-D state space diagram showing the six resulting regions which result from combining the linguistic regions for feed and depth of cut.

As is known in the art, the curling and breaking patterns of the chip for feed speed and depth of cut are different and are primarily dependent on the nature of chip flow in these regions. Thus, fuzzy classified regions of feed-depth of cut are considered very relevant in not only differentiating between chip curl patterns, but also explaining the curling and breaking behavior of a chip in an intermediate region due to a combined effect of neighboring regions. Accordingly, the present method provides for classifying the feed into three linguistic regions according to rate of feed, as shown in FIG. 5a, wherein:
VLF=very low feed
LF=low feed
MF=medium feed In addition, the depth of cut is similarly fuzzified into two regions, as shown in FIG. 5b, wherein:
LD=low depth
MD=medium depth Accordingly, the combination of the three feeds and two depth of cut regions results in six regions on the chip chart with varying membership values, as shown in FIG. 6.

Following the characterization and classification of the commercially available tool inserts based upon the various geometric parameters, experimental tests are performed on all the selected tool inserts representing the five subgroups under a wide range of cutting conditions. This is followed-up by an investigation of the chip breaking performance in each finish turning insert subgroup. More specifically, experimental tests are performed in all six feed-depth of cut regions in order to determine the most significant geometric parameters affecting the chip breakability. A sensitivity rating system is developed for determining the order of the most significant geometric parameters that influence chip breakability for a given set of conditions. The result is a linguistic value being obtained for each insert for each range of feed and depth of cut, wherein the linguistic values are obtained from the slope of the lines which determine the effective change in chip breakability over the entire range of parameter values wherein the linguistic values are as follows:

0=VP=very poor
1=P=poor
2=F=fair
3=G=good
4=E=excellent

Using the experimentally obtained data, experimental chip charts are developed for each of the commercially available tool inserts. The chip charts are developed over the entire range of each feed-depth of cut for which experimental tests were performed. The chip charts and sensitivity rating system provide a database, setting forth chip breakability information for the tool inserts over a variety of feed-depth of cut ranges.

A fuzzy rule base is then developed for relating chip groove geometric parameters to chip breaking performance. It is necessary to establish a modified rule base predictive model involving a hierarchy of chip groove parameters which are determined from the sensitivity test for each region of feed depth of cut matrix. More specifically, the combined profile type CPT, which is defined as a combination of the groove type GT and backwall height, functionally determines the geometric features of a chip groove and is the essential basis for the development of the fuzzy rule base.

Based upon the resulting fuzzified combined profile type, a rule based chip breakability predicting system is formulated to predict the performance of tool inserts having different groove profiles. In general, a chip groove profile may belong to a maximum of eight combined profile types denoted as $CPT_i$, i=1, 2, ... 8, with a corresponding membership grade $\mu_i$ (CPT). The associated rules in the knowledge based database system for the chip breakability based on combined profile type CPT are as follows:

$$\text{IF} \quad CPT = CPT_i \quad \text{Equation 2}$$
$$\text{AND} \quad \text{CUTTING CONDITIONS} = \text{Cond.}$$
$$\text{THEN} \quad CB = CB_{ij}, \mu_{ij}(CB_{ij})$$

where
$CB_{ij} \in \{VP, P, F, G, E\}$, i=1, 2, ..., 8;
j=1, 2.
(VP=Very Poor, P=Poor, F=Fair, G=Good, E=Excellent)

Equation 3 summarizes the procedure for chip breakability assessment:

$$\mu_{CB} = \max \min (\mu_i(CPT), \mu_{ij}(CB))\ i=1,2,\ldots 8;\ j=1, 2 \quad \text{Equation 3}$$

Thus, the fuzzy inferencing methods discussed above, combined with the knowledge based chip breakability database, is integrated systematically into a fuzzy rule base and then used to evaluate the chip breaking performance for any given chip groove profile under a range of cutting conditions. More particularly, the fuzzy rule base may take the form of software on disc or CD Rom, hardware such as a dedicated chip for use with a personal computer or dedicated microcontroller. Thus, an example of one embodiment of the invention is the CBET software which is the subject of copyright protection. Two possible applications of the fuzzy rule base may include the following. First, for any given tool insert not already set forth in the fuzzy rule base, the chip breakability for the chosen tool insert may be predicted based upon chip groove profile and the selected geometric parameters which may influence the chip breaking performance. Second, for a tool insert already contained in the fuzzy rule base, it is possible to predict the chip breakability for that tool insert based upon other desired cutting conditions not already experimentally obtained.

The following example is set forth to further illustrate the general procedure for using the fuzzy rule base system to predict chip breaking performance for a given groove profile, but it is not to be considered as limited thereto.

EXAMPLE 2

The tool insert selected for this example is designated as CG13. The geometric parameters are measured as:

groove width GW=1.6 mm
groove depth GD=0.15 mm
backwall height BH=0.005 mm

Utilizing the groove classification system as set forth and described above, the following groove classification is obtained.

(1) Fuzzification of groove parameters:
GW=0.5/M, 0.5/W
GD=1.0/M
BH=1.0/SD (2) Characterization of groove types (GT):
{0.5/GT5, 0.5/GT8}

(3) The combined profile type (CPT):
{0.5//GT5/SD, 0.5//GT8/SD} where "0.5//GT5/SD" denotes that the combined profile type CPT has 0.5, or 50%, attachment to groove type GT5 and 0.5, or 50%, attachment to groove type SD, "Standard."

Thus, it is then determined that the CPT level of the groove profile belongs equally to GT5/SD and GT8/SD, both in the medium turning insert range. The backwall height is Standard, with certainty level of 1.0. This combination is not expected to produce good chip breakability in the finish turning range.

Next, consider the case when the following cutting conditions are used (denoted as {Cond.} in the rule-base):

| | | |
|---|---|---|
| Cutting speed | = | 230 m/min |
| Feed | = | 0.09 mm/rev |
| Work material | = | AISI 1045 Hot-rolled Steel (BHN 165-190) |
| Side Cutting Angle | = | 900 |
| Depth-of-Cut | = | 0.45 mm |

A total of 4 rules in the VLF-LD and LF-LD ranges can be selected as follows:

Rules 1 and 2

```
IF      GW is Medium
AND     GD is Medium
AND     BH is Standard
AND     Cutting Conditions are {Cond.}
THEN (in VLF–LD range)              (in LF–LD range)
    CB₁ is P, μ_B1 = 0.3            CB₃ is F, μ_CB3 = 0.9
AND
    CB₂ is VP, μ_CB2 = 0.7          CB₄ is G, μ_CB4 = 0.1
```

Rules 3 and 4

```
IF      GW is Wide
AND     GD is Medium
AND     BH is Standard
AND     Cutting Conditions are {Cond.}
THEN (in VLF–LD range)              (in LF–LD range)
    CB₅ is P, μ_CB5 = 0.1           CB₇ is P, μ_CB7 = 0.7
AND
    CB₆ is VP, μ_CB6 = 0.9          CB₈ is G, μ_CB8 = 0.3
```

The chip breakability in VLF-LD and LF-LD range can then be predicted based on the fuzzy inferencing as follows:

$$CB = \{0.3/P, 0.5/VP\} \quad \text{in VLF-LD range}$$

$$CB = \{0.5/P, 0.5/F, 0.1/G\} \quad \text{in LF-LD range}$$

Using the fuzzy classification method on two neighboring clusters, the chip breakability performance at feed=0.107 mm/rev and depth-of-cut=0.45 mm can be obtained, and is the following:

$$CB = \{0.12/VP, 0.45/P, 0.38/F, 0.08/G\}$$

This indicates that the produced chips are expected to belong to two main chip-forms P and F, with about 15% greater chance for chips to be of the form P.

The experimental verification under the same cutting conditions produces chip-forms between poor (P) and fair (F), as shown in FIG. 7. This checks very well with the above prediction, where the chip breakability is estimated as 45% poor (0.45/P) and 38% fair (0.38/F).

In summary, the present invention sets forth an efficient and more effective means for assessing chip breaking performance of a tool insert used in finish turning operations. Specifically, the present method develops a predictive system for chip breakability directly correlating the chip groove geometric parameters with the chip breaking performance. Further, it should be appreciated that the present method also eliminates experimentation by users of tool inserts to determine effectiveness of the inserts. As a result, there is no need to maintain an extensive tool insert inventory, no need to complete actual testing of inserts at least at the time of preliminary screening and analysis time and labor are substantially reduced. This all points to significant cost savings.

In other words, there is no longer a need for a trial and error approach in selecting a proper tool insert for a given set of cutting conditions. Thus, the present method by providing a reliable means for assessing chip breaking performance further allows tool insert designers and manufacturers to design more effective tool inserts that are capable of performing their intended operations.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

We claim:

1. A method for assessing chip breaking performance of a selected tool insert, said method comprising:

developing a chip groove classification system based upon geometric parameters of known tool inserts selected from the group consisting of edge radius, primary rake, land, first groove width, first groove depth, first backwall slope, first backwall height, secondary rake angle, second groove width, second backwall slope and second backwall height;

creating a fuzzy rule base utilizing said classification system and actual chip breaking performance of said known tool inserts; and assessing the chip breaking performance of the selected tool insert using said fuzzy rule base.

2. The method set forth in claim 1, wherein developing said chip groove classification system includes classifying said known tool inserts into groups according to selected geometric parameters.

3. The method set forth in claim 1, further including determining selected geometric parameters which most significantly effect said chip breaking performance of said known tool inserts, using a sensitivity test.

4. A method for assessing chip breaking performance of a selected tool insert used in finish turning operations utilizing a chip groove classification system and actual chip breaking performance of known tool inserts, comprising:

characterizing said known tool inserts based upon geometric parameters selected from the group consisting of edge radius, primary rake, land, first groove width, first groove depth, first backwall slope, first backwall height, secondary rake angle, second groove width, second backwall slope and second backwall height;

classifying said known tool inserts into groups according to said selected geometric parameters;

ordering said selected geometric parameters based upon significance of influence said geometric parameters have upon chip breakability; selected geometric parameters to said chip breakability;

developing a fuzzy rule base which relates said order of said selected geometric parameters to said chip breakability;

assessing the chip breaking performance of the selected tool insert using said fuzzy-rule base.

5. The method set forth in claim 4, wherein the step of characterizing said known tool inserts further includes identifying a groove type GT, said groove type GT being a function of groove width GW and groove depth GD.

6. The method set forth in claim 5, further including characterizing said known tool inserts based upon backwall dimensions.

7. The method set forth in claim 6, further including determining a combined profiled type CPT as a function of said groove type GT characterization and said backtalk characterization.

8. The method set forth in claim 4, wherein the step of classifying said known tool inserts into groups further includes identifying said known tool inserts as single groove with reduced backwall, single groove with standard backwall, single groove with raised backwall, double groove with low raised second backwall and double groove with high raised second backwall.

9. A method for assessing chip breaking performance of a selected tool insert used in finish turning operations utilizing a chip groove classification system and actual chip breaking performance of known tool inserts, comprising:

characterizing said known tool inserts based upon geometric parameters;

classifying said known tool inserts into groups according to said selected geometric parameters;

ordering said selected geometric parameters based upon significance of influence said geometric parameters have upon chip breakability;

developing a fuzzy rule base which relates said order of said geometric parameters to said chip breakability;

assessing the chip breaking performance of the selected tool insert using said fuzzy-rule base;

wherein said step of classifying said known tool inserts into groups further includes identifying said known tool inserts as single groove with reduced backwall, single groove with standard backwall, single groove with raised backwall, double groove with low raised second backwall and double groove with high raised second backwall.

* * * * *

UNITED STATES PATENT AND TRADEMARK OFFICE
CERTIFICATE OF CORRECTION

PATENT NO. : 5,941,143
DATED : August 24, 1999
INVENTOR(S) : Ibrahim S. Jawahir et al.

It is certified that error appears in the above-identified patent and that said Letters Patent is hereby corrected as shown below:

Col. 11, line 3
replace "backtalk"
with --backwall--.

Signed and Sealed this

Fifth Day of September, 2000

Attest:

Attesting Officer

Q. TODD DICKINSON
Director of Patents and Trademarks